United States Patent
Sarma et al.

(10) Patent No.: US 10,733,024 B2
(45) Date of Patent: Aug. 4, 2020

(54) TASK PACKING SCHEDULING PROCESS FOR LONG RUNNING APPLICATIONS

(71) Applicants: Joydeep Sen Sarma, Bangalore (IN); Abhishek Modi, Bangalore (IN)

(72) Inventors: Joydeep Sen Sarma, Bangalore (IN); Abhishek Modi, Bangalore (IN)

(73) Assignee: Qubole Inc., Santa Clara, CA (US)

( * ) Notice: Subject to any disclaimer, the term of this patent is extended or adjusted under 35 U.S.C. 154(b) by 176 days.

(21) Appl. No.: 15/988,535

(22) Filed: May 24, 2018

(65) Prior Publication Data
US 2018/0341524 A1 Nov. 29, 2018

Related U.S. Application Data

(60) Provisional application No. 62/510,292, filed on May 24, 2017.

(51) Int. Cl.
*G06F 9/50* (2006.01)
*G06F 9/48* (2006.01)

(52) U.S. Cl.
CPC ............ *G06F 9/505* (2013.01); *G06F 9/4881* (2013.01); *G06F 9/4887* (2013.01); *G06F 9/5072* (2013.01); *G06F 9/5083* (2013.01)

(58) Field of Classification Search
CPC .............................. G06F 9/5083; G06F 9/5088
See application file for complete search history.

(56) References Cited

U.S. PATENT DOCUMENTS

| | | | |
|---|---|---|---|
| 5,603,001 A | 2/1997 | Sukegawa et al. | |
| 5,907,675 A | 5/1999 | Aahlad | |
| 6,192,391 B1 | 2/2001 | Ohtani | |
| 6,460,027 B1 | 10/2002 | Cochrane et al. | |
| 6,601,062 B1 | 7/2003 | Deshpande et al. | |
| 6,847,962 B1 | 1/2005 | Cochrane et al. | |
| 7,680,994 B2 | 3/2010 | Buah et al. | |
| 7,844,853 B2 | 11/2010 | Barsness et al. | |
| 7,848,261 B2 | 12/2010 | Fachan | |
| 8,255,516 B1 * | 8/2012 | Zhang | H04L 67/10 709/203 |
| 8,260,840 B1 | 9/2012 | Sirota et al. | |
| 8,296,419 B1 | 10/2012 | Khanna et al. | |
| 8,996,482 B1 | 3/2015 | Singh et al. | |
| 9,049,746 B2 | 6/2015 | Periyalwar et al. | |
| 9,451,013 B1 | 9/2016 | Roth et al. | |
| 9,483,785 B1 | 11/2016 | Corley et al. | |
| 9,531,607 B1 | 12/2016 | Pai et al. | |
| 9,571,561 B2 | 2/2017 | Jang | |
| 9,645,859 B1 | 5/2017 | Dash et al. | |
| 9,860,569 B1 | 1/2018 | Wilms et al. | |
| 10,069,693 B1 | 9/2018 | Daptardar et al. | |
| 2002/0145983 A1 | 10/2002 | Block et al. | |
| 2002/0157113 A1 | 10/2002 | Allegrezza | |
| 2003/0005350 A1 | 1/2003 | Koning et al. | |
| 2003/0065874 A1 | 4/2003 | Marron et al. | |
| 2004/0193626 A1 | 9/2004 | Colby et al. | |
| 2005/0222996 A1 | 10/2005 | Yalamanchi | |
| 2005/0278387 A1 | 12/2005 | Kamada et al. | |
| 2007/0094290 A1 | 4/2007 | Oka et al. | |
| 2007/0195810 A1 | 8/2007 | Fachan | |
| 2007/0294493 A1 | 12/2007 | Buah et al. | |
| 2008/0141065 A1 | 6/2008 | Okabe | |
| 2009/0043873 A1 | 2/2009 | Barsness et al. | |
| 2009/0182779 A1 | 7/2009 | Johnson | |
| 2009/0222418 A1 | 9/2009 | Layman | |
| 2009/0327854 A1 | 12/2009 | Chhajer et al. | |
| 2010/0005173 A1 * | 1/2010 | Baskaran | G06F 9/5066 709/226 |
| 2010/0153482 A1 | 6/2010 | Kim et al. | |
| 2010/0306286 A1 | 12/2010 | Chiu et al. | |
| 2011/0119449 A1 | 5/2011 | Neerincx et al. | |
| 2011/0167221 A1 | 7/2011 | Pangal et al. | |
| 2011/0191461 A1 * | 8/2011 | Dasgupta | G06F 15/173 709/224 |

(Continued)

OTHER PUBLICATIONS

Ajiro, Yasuhiro and Atsuhiro Tanaka. "Improving Packing Algorithms for Server Consolidation." Int. CMG Conference (2007), pp. 1-23 [retrieved from https://www.semanticscholar.org/paper/Improving-Packing-Algorithms-for-Server-Ajiro-Tanaka/3cd95539f604af450a8b81b82aed186467f22257]. (Year: 2007).*
International Search Report for PCT/US2015/045419 dated Oct. 2, 2015; 2 pages.
International Search Report for PCT/US2015/050174 dated Nov. 16, 2015; 2 pages.
International Search Report for PCT/US2015/057003 dated Dec. 13, 2015; 2 pages.

*Primary Examiner* — Brian W Wathen
(74) *Attorney, Agent, or Firm* — Landmark Intellectual Property Law, PLLC

(57) ABSTRACT

In general, the invention is directed to systems and methods of distributing tasks amongst servers or nodes in a cluster in a cloud-based big data environment, including: establishing a high_server_threshold; dividing active servers/nodes into at least three (3) categories of high usage servers, comprising servers on which usage is greater than the high_server_threshold; medium usage servers, comprising servers on which usage is less than the high_server_threshold, but is greater than zero; and low usage servers, comprising servers that are currently not utilized; receiving one or more tasks to be performed; scheduling the tasks by: first requesting that medium usage servers take tasks; if tasks remain that are not scheduled on the medium usage servers, schedule remaining tasks on low usage servers; if any tasks remain that are not scheduled on medium usage servers or low usage servers, scheduling remaining tasks on high usage servers.

20 Claims, No Drawings

(56) References Cited

U.S. PATENT DOCUMENTS

| | | |
|---|---|---|
| 2011/0314485 A1 | 12/2011 | Abed |
| 2012/0047339 A1 | 2/2012 | Decasper et al. |
| 2012/0102291 A1 | 4/2012 | Cherian et al. |
| 2012/0151272 A1 | 6/2012 | Behrendt et al. |
| 2012/0215763 A1 | 8/2012 | Hughes et al. |
| 2012/0259963 A1* | 10/2012 | Doddavula ........... G06F 9/5061 709/223 |
| 2012/0304192 A1 | 11/2012 | Grove et al. |
| 2013/0110764 A1 | 5/2013 | Wilf |
| 2013/0124483 A1 | 5/2013 | Furuhashi et al. |
| 2013/0132967 A1 | 5/2013 | Soundararajan et al. |
| 2013/0179881 A1 | 7/2013 | Calder et al. |
| 2013/0189969 A1 | 7/2013 | Periyalwar et al. |
| 2013/0204948 A1 | 8/2013 | Zeyliger et al. |
| 2013/0227558 A1 | 8/2013 | Du et al. |
| 2013/0232254 A1 | 9/2013 | Srikanth et al. |
| 2013/0254171 A1 | 9/2013 | Grondin et al. |
| 2013/0290771 A1 | 10/2013 | Kim et al. |
| 2013/0318379 A1 | 11/2013 | Seshadri et al. |
| 2013/0332612 A1 | 12/2013 | Cai et al. |
| 2014/0040575 A1 | 2/2014 | Horn |
| 2014/0059306 A1 | 2/2014 | Bender et al. |
| 2014/0059552 A1 | 2/2014 | Cunningham et al. |
| 2014/0067992 A1 | 3/2014 | Saeki |
| 2014/0095505 A1 | 4/2014 | Blanchflower et al. |
| 2014/0149566 A1* | 5/2014 | Doddavula ........... G06F 9/5061 709/223 |
| 2014/0149590 A1 | 5/2014 | Mallipeddi et al. |
| 2014/0156777 A1 | 6/2014 | Subbiah et al. |
| 2014/0189109 A1 | 7/2014 | Jang |
| 2014/0195558 A1 | 7/2014 | Murthy et al. |
| 2014/0279838 A1 | 9/2014 | Tsirogiannis et al. |
| 2015/0222705 A1 | 8/2015 | Stephens |
| 2015/0234688 A1 | 8/2015 | Dageville et al. |
| 2015/0242197 A1 | 8/2015 | Alfonso et al. |
| 2015/0379026 A1 | 12/2015 | Todd et al. |
| 2016/0065627 A1 | 3/2016 | Pearl et al. |
| 2016/0179581 A1 | 6/2016 | Soundararajan et al. |
| 2016/0224638 A1 | 8/2016 | Bestler et al. |
| 2016/0350371 A1 | 12/2016 | Das et al. |
| 2016/0371193 A1 | 12/2016 | Floratou et al. |
| 2017/0337138 A1 | 11/2017 | Li et al. |
| 2018/0159727 A1 | 6/2018 | Liu et al. |

\* cited by examiner

TASK PACKING SCHEDULING PROCESS FOR LONG RUNNING APPLICATIONS

RELATED APPLICATIONS

The present application claims priority to U.S. Provisional Patent Application No. 62/510,292, filed on 24 May 2017, which is incorporated herein by reference in its entirety.

BACKGROUND

In general, the present application is directed to systems and methods of scheduling applications and tasks running on a server. More specifically, the present invention is directed to task packing—a strategy to schedule tasks on a subset of available servers instead of distributing it evenly.

A common application processing architecture is often to have a pool of servers (a Cluster) processing different tasks. Tasks may be distributed amongst different servers using, among other things: (i) a Central Queue, which may be used in job processing frameworks like Python's Celery or Ruby's DelayedJob, in which each server in the queue may poll the queue to obtain tasks to run on itself; and or (ii) a Central Scheduler, which may actively hands out tasks—for example: Apache YARN used by BigData frameworks like MapReduce, Tez and Spark, Kubernetes used to schedule Containers over a server farm. Schedulers such as YARN (which may be utilized by MapReduce, Tez, and/or Spark) tries by default to allocate resources to tasks based on the availability of resources on each server, as well as locality constraints specified by the task. If multiple servers satisfy these constraints, such schedulers generally allocate resources uniformly among qualified servers.

This design works well in on-premise, fixed-size cluster deployments, ensuring that a single node failure doesn't have much impact on running jobs. It also helps to utilize as many nodes as possible and avoids over-utilization of a single node. While YARN tries its best to keep track of resource utilization, it is inherently hard to account for usage of resources like network links accurately, and spreading the load around is an easy way to avoid resource hot-spots.

In a cloud deployment it is common to have an elastic cluster such as Qubole's Auto-Scaling Hadoop/Spark cluster. Users configure a minimum and maximum cluster size and the cluster automatically scales up and down according to the workload and other factors.

Critical to downscaling is finding nodes that can be removed from the cluster. Unlike HTTP requests to a web application, Big Data applications are frequently long running. Moreover tasks run by such applications are not stateless (unlike HTTP requests). They leave behind state on local disks that may be needed for the lifetime of the application.

For example, (i) Tasks launched by Map-Reduce may run for a long time because of data skew or the number of tasks is small relative to the number of data; and/or (ii) a Hive Query may run for days and the process coordinating (the Hive JVM) this query has to run for an equivalent time.

In such a scenario, a uniform resource allocation strategy becomes a huge drawback. Incoming tasks are evenly distributed to all available and qualified nodes. Most nodes are either running active tasks or have state from previous ones that blocks Qubole's cluster management from deprovisioning the nodes and downscaling. As a result, once the cluster scales up, it's difficult to downscale—even if the current workload can be run on a much smaller number of nodes.

Such Uniform Scheduling may fit well in on-premise fixed size cluster deployment, such that—for example—a single server failure may not have much impact on running applications. This Uniform Scheduling may also help to utilize as many servers as possible and may avoid pressuring single server beyond its limitation. However, there are at least two situations where this default algorithm may cause issues.

First, Uniform Scheduling may prove to be a detriment when Tasks are long running. This may become a drawback in a cloud deployment in the context of an Auto-Scaling Cluster. A server cannot be deprovisioned (or it may undesirable to deprovision such a server) if it always has tasks running on it—and this may be highly likely because tasks are always scheduled uniformly amongst all available servers. Big Data workloads, in particular, may have lots of long running tasks. For example, (i) Tasks launched by Map-Reduce may run for a long time because of data skew or the number of tasks is small relative to the number of data; and/or (ii) a Hive Query may run for days and the process coordinating (the Hive JVM) this query has to run for an equivalent time.

Even in the case of short running tasks, a problem may arise if the task leaves behind state (such as files) on the Server that may be required over a long interval. As an example, in Big-Data processing frameworks like Map-Reduce and Spark a task may leave 'Shuffle' data on local disks that may be streamed to other tasks over a potentially long interval of time. When such data is left behind, downscaling nodes from the cluster may be unavailable or not permitted.

The inability (or undesirability) to deprovision may result in higher expense—as servers may not be deprovisioned even if the current workload can be accommodated on a much smaller number of servers. Accordingly, this may increase the running cost of products such as Qubole's Auto-Scaling Big-Data clusters and its multi-tenant Hive Server tier. Inability (or undesirability) to deprovision may result in higher expense—as servers may not be deprovisioned even if the current workload can be handled by a few number of servers.

Another way to characterize this behavior is through the utilization percentage of the entire cluster. For example, in the prior art this generally hovers at approximately 20-30% and is clearly not cost-effective.

Accordingly, there is a need in the art for revised task scheduling that performs non-uniform scheduling that may both support current and future processing (such as, for example, those found in cloud-based big-data processing), as well as provide economic advantages based on the same.

In response to these needs, the present invention presents a new scheduling algorithm called "Task Packing" or "Container Packing." As discussed in greater detail below, each term may be used to describe a new resource allocation strategy that may make more nodes available for downscaling in an elastic computing environment, while preserving hot spots in the cluster and trying to honor data locality preferences. In other words, the present invention may provide a strategy to schedule tasks on a subset of the available servers instead of distributing it evenly. This may allow few servers to downscale if cluster is not utilized fully (or as desired) and hence may allow improved downscaling and cluster utilization. Task Packing may take locality and other placement constraints into account as well if feasible.

In practice, such Task Packing has been seen to result in hardware savings of more than 40%.

SUMMARY OF THE INVENTION

Some aspects of the invention, in accordance with some embodiments of the present invention may include a method of distributing tasks amongst servers or nodes in a cluster in a cloud-based big data environment, comprising: establishing a high_server_threshold; dividing active servers/nodes into at least three (3) categories comprising: (i) high usage servers, comprising servers on which usage is greater than the high_server_threshold; (ii) medium usage servers, comprising servers on which usage is less than the high_server_threshold, but is greater than zero; and (iii) low usage servers, comprising servers that are currently not utilized; receiving one or more tasks to be performed; scheduling the received one or more tasks by: first requesting that medium usage servers take the one or more tasks; if tasks remain that are not scheduled on the medium usage servers, schedule remaining tasks on low usage servers; if any tasks remain that are not scheduled on medium usage servers or low usage servers, scheduling remaining tasks on high usage servers.

Some aspects of the invention, in accordance with some embodiments of the present invention, may include a method of distributing tasks amongst servers or nodes in a cluster in a cloud-based big data environment, comprising: establishing a high_server_threshold; dividing active servers/nodes into at least three (3) categories comprising: (i) high usage servers, comprising servers on which usage is greater than the high_server_threshold; (ii) medium usage servers, comprising servers on which usage is less than the high_server_threshold, but is greater than zero; and (iii) low usage servers, comprising servers that are currently not utilized; receiving one or more tasks to be performed; scheduling the received one or more tasks by: first requesting that high usage servers take the one or more tasks; if tasks remain that are not scheduled on the high usage servers, schedule remaining tasks on medium usage servers; if any tasks remain that are not scheduled on high usage servers or medium usage servers, scheduling remaining tasks on low usage servers.

Some aspects of the invention, in accordance with some embodiments of the present invention may include a method of distributing tasks amongst servers or nodes in a cluster in a cloud-based big data environment, the method having no impact on upscaling of the system and initiated after the cluster is above a minimum size and disabled when the cluster is at a minimum size, the method comprising: establishing a high_server_threshold; dividing active servers/nodes into at least three (3) categories comprising: (i) high usage servers, comprising servers on which usage is greater than the high_server_threshold; (ii) medium usage servers, comprising servers on which usage is less than the high_server_threshold, but is greater than zero; and (iii) low usage servers, comprising servers that are currently not utilized; receiving one or more tasks to be performed; scheduling the received one or more tasks by: first requesting that medium usage servers take the one or more tasks, wherein medium usage servers are assigned tasks in accordance with any applicable resource requirement or locality constraint, and wherein such tasks are assigned evenly so that each medium usage server is allocated substantially the same amount of tasks; if tasks remain that are not scheduled on the medium usage servers, schedule remaining tasks on low usage servers, wherein such scheduling on low usage servers is performed after a locality delay; if any tasks remain that are not scheduled on medium usage servers or low usage servers, scheduling remaining tasks on high usage servers; and if any task has been in a queue for an undesirably long period of time, such task is assigned to a first available server.

These and other aspects will become apparent from the following description of the invention taken in conjunction with the following drawings, although variations and modifications may be effected without departing from the spirit and scope of the novel concepts of the invention.

DETAILED DESCRIPTION

The present invention can be more fully understood by reading the following detailed description together with any accompanying drawings. Before any embodiment of the invention is explained in detail, it is to be understood that the invention is not limited in its application to the details of construction and the arrangements of components set forth in the following description or illustrated in any drawings. The embodiments depicted are to be understood as exemplary and in no way limiting of the overall scope of the invention. Also, it is to be understood that the phraseology and terminology used herein is for the purpose of description and should not be regarded as limiting.

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

As noted above, the present invention is generally directed to systems and methods of scheduling applications and tasks running on a server. More specifically, the present invention is directed to task packing—a strategy to schedule tasks on a subset of available servers instead of distributing it evenly. In this specification, some terms may be used which may be defined as follows:

Server. A machine (physical/virtual) that is being managed by a scheduler like YARN. It may have its own OS running and a fixed RAM and Cores allocated to it. These are also commonly and interchangeably referred to as Nodes.

Task. A Task refers to a unit of computation running on a Server. Examples may include (i) a Java server process processing a Hive SQL query; (ii) a Linux container running an arbitrary application; or (iii) a long running Ruby VM processing a long running Ruby task.

Application. An Application may refer to an end-user job that generates one or more Tasks. Examples of Applications may include a Hive Query or a Spark Application.

Cluster. A cluster may refer to a set of servers collectively managed to process application task units.

Auto-Scaling Cluster. A cluster which is dynamically sized up or down based on application workload.

Deprovisioning. The process of removing a server from a cluster, for example after any application task units running on such cluster have finished.

In accordance with some embodiments of the present invention, task/container packing may performed, in general, by categorizing the nodes/servers and assigning work in a non-distributed nature.

First, active cluster nodes/servers and/or servers may divided into at least three (3) categories: (i) High Usage Servers/Nodes; (ii) Medium Usage Servers/Nodes; and (iii) Low Usage Servers/Nodes. High Usage Server/Nodes may be nodes whose resource usage (memory) may be greater than a HIGH_server_THRESHOLD (as defined below). Medium Usage Server/Nodes may be nodes whose resource usage is less than HIGH_server_THRESHOLD, but greater than 0% (meaning that at least some containers are running on the server/node). Low Usage Servers/Nodes may define remaining servers/nodes that do not have any running containers—or in exceptional cases, a small number of running containers.

The term HIGH_server_THRESHOLD may be used to describe the level of utilization beyond which a server is considered highly utilized. This may be based on a single variable (for example 80% CPU utilization) or multiple variables (for example either 80% CPU OR 60% memory). The utilization threshold (80%, 60%) for each variable and how they are combined may be configurable.

Initially when a cluster starts it may be divided into Medium Usage servers and Low Usage Servers. As servers get loaded, some of them may move into the High Usage Server category. If the High Usage Servers become large enough percentage, there may not be any Low Usage Servers left in the Cluster.

The classification of servers into these sets and the scheduling protocol may occur or kick in when the cluster is above a certain minimum size (because the need to downscale does not exist at or below the minimum size). Note that in some embodiments of the present invention, the classification of servers into Medium and Low Usage may be somewhat arbitrary. For example initially all the servers may be set at 0% utilization—yet some may be classified into the Low Set and some into the Medium Set.

Scheduling Protocol. When requests for task scheduling arrive on a central scheduler (like YARN), at least three (3) steps may occur. First, Medium Usage Servers may first be requested to schedule the task. This request may take into account resource requirements and locality constraints of the Task (as the Scheduler normally does). Aside from skews due locality constraints, tasks may be scheduled into the Medium servers. In accordance with some embodiments, tasks may be scheduled into the Medium servers evenly, so that each Medium server is allocated substantially the same amount of tasks. Higher utilization nodes from amongst this set may be given preference, so that the remaining nodes in this category may become Low Usage Servers over time, and accordingly trigger a downscaling.

Second, if a request cannot be scheduled on the Medium Usage Servers, it may be first attempted to schedule such request on Low Usage servers and then finally on High Usage servers. In practice, the scheduling protocol may wait for some amount of time for Step A. (commonly called the Locality Delay) to allow all servers to be checked and to allow Servers to become free (since they are continuously finishing tasks). Note that Low Usage Servers may be selected randomly, or according to some other priority (e.g., cost considerations, location, etc.).

Third, any request that were not satisfied with Medium Usage Servers or Low Usage Servers may be scheduled against High Usage Servers. In some circumstances, first priority among High Usage Servers may be given to servers with lower usage to avoid hot-spots in the system. Variants of this scheduling algorithm may invert the steps in Step B. For example, to try to schedule first on the High Usage Servers and then the Low Usage Servers. This may allow higher packing in exchange for potentially degraded performance (for example, because of overloaded servers).

It is notable that task/container packing does not have any real impact on upscaling. Upscaling in clusters (for example, in YARN) may be triggered, for example, by container requests waiting for more than three (3) minutes. This may ensure that requests reside for sufficient time to be scheduled on any available servers before triggering any upscaling. Also note that task/container packing may be disabled if a cluster is at its minimum size.

In a queue based system—where every server is polling the queue—this protocol may be implemented in a few different ways. In accordance with some embodiments of the present invention, in approximate terms by having Medium Usage, Low Usage and High Usage servers poll at decreasing frequencies (i.e. Medium polls most frequently) so that the odds are that a task may be likely to be scheduled on Medium (and then Low and then High). Alternatively, and in accordance with some embodiments of the present invention, each server may maintain information about the state of the Cluster and its members—and run the scheduling algorithm. It may pick up a task from the Queue only if it thinks it is the right server to run it. Eventually the right server will run the scheduling algorithm. As a safeguard against failed nodes, after a task has been in the queue for some long period of time—the first available server may pick up the task.

Usage Classification. Usage Classification may run continuously. In a centralized scheduler such as YARN it may run during every scheduling action. In a queue based Cluster (like Celery) it may run as an external service. For example, assume that the cluster size is N. The following steps may describe this protocol.

First, a server may be classified as High Usage. For example, this classification may be made by looking at the server's utilization. This type of classification may not be dependent on any other criteria or the state of other servers. High Usage Servers may be identified first. As an example, let's say the number identified in any iteration is H.

Second, servers—excluding the High Usage server—may then be sorted by utilization (for example, by using the IP address as a secondary key so that the sorted order may be consistent across runs if utilization doesn't change).

Third, a maximum amount of low usage nodes may be set. In accordance with some embodiments of the present invention, this amount may be determined by:

$$L_{max} = N - H - N*\text{MEDIUM\_server\_QUOTA}$$

Low Usage Nodes. If this number is greater than zero, we may first classify any zero utilization nodes up to this number into the low utilization set. Let's call this number $L_1$ Fourth, if $L_1$ is equal to $L_{max}$—then all the Low Usage nodes may have been identified and the rest of the nodes may be considered Medium Usage Nodes.

Finally, if $L_1$ is less than $L_{max}$—then some additional nodes can be assigned to Low Usage set, even though they are not zero utilization. This may be fairly tricky because the best nodes for the Low set may be those that can be deprovisioned easily.

We implement this by running a periodic job to sort nodes by the estimated completion time of their tasks. This estimation may be highly workload dependent—in Map-Reduce for example this may be computed by looking at the elapsed time and the progress rate of the tasks as well as any state written out to the local drives of these servers. The remaining Low Usage nodes may be picked from the first members of this sorted set.

Note that this process may is provided to inform a reader of one of many ways of performing such usage classification, and may be deviated in order and with the addition or deletion of certain steps.

Note that in accordance with some embodiments of the present invention, a MEDIUM_server_QUOTA may be utilized, which is a configurable percentage of the cluster size (for example, eighty percent (80%). In such embodiments, servers may be divided into three (3) different categories: (i) High Usage servers—servers on which usage is greater than HIGH_server_THRESHOLD; (ii) Medium Usage servers—servers whose usage is less than HIGH_server_THRESHOLD up to a maximum of MEDIUM_server_QUOTA; and (iii) Low Usage servers—the remaining servers of cluster which are not part of High Usage servers and Medium Usage servers. Initially when the cluster starts it may be divided into Medium Usage servers (MEDIUM_server_QUOTA %) and Low Usage Servers. As servers get loaded, some of them may move into the High Usage Server category. If the High Usage Servers become large enough percentage (ie. more than 100—MEDIUM_server_QUOTA), there may not be any Low Usage Servers left in the Cluster.

The classification of servers into these sets and the scheduling protocol may occur or kick in when the cluster is above a certain minimum size (because the need to downscale does not exist at or below the minimum size). Note that in some embodiments of the present invention, the classification of servers into Medium and Low Usage may be somewhat arbitrary. For example initially all the servers may be set at 0% utilization—yet some may be classified into the Low Set and some into the Medium Set.

Gang Scheduling. Tasks may be issued on behalf of applications. For example, application $A_1$ may issue 100 tasks and application $A_2$ may issue 50 tasks, for a total of 150 tasks to be executed on the cluster. In many applications many or all of the tasks for the application may finish at the same time.

If tasks for a given application are spread across many servers, then when an applications finish no clear subset of servers are freed up. This is analogous to the original problem of uniform scheduling across the entire Cluster. For the same reasons it may be advantageous to keep tasks of the same application scheduled on a smaller subset of the server—a concept similar to Gang Scheduling.

Task Packing may be enhanced to accomplish Gang Scheduling. For example, a scheduling action for a task T belonging to application A may be considered. Then, when scheduling task T into any set of servers (Medium, Low or High)—the servers may be sorted by the number of tasks running on behalf of application A (from high to low). Subsequently, T may be scheduled (or attempted to be scheduled) into the first available server in this sorted list. This may cause tasks from the same application to more likely be scheduled on the same set of nodes.

Task Rescheduling. Even though a scheduler may make an attempt to place tasks initially in Medium or High Usage Nodes—over time long running tasks allocated to an application may end up being resident in Low Usage Nodes. In some circumstances, this may block downscaling of such Low Usage Nodes. Accordingly, under such conditions—in order to free up such nodes—the scheduler and the application may coordinate to reschedule such tasks into Medium/High Usage Nodes. One strategy for doing this is for Applications to stop tasks and start them again. In such cases such tasks will be automatically rescheduled on restart. A variant to this strategy is for the Application to request the Scheduler for a better Node—and if the Scheduler identifies more optimal Nodes—the Application may migrate tasks from the current set of Nodes to the newly identified set of Nodes. Such strategies may be executed periodically in the background and may be particularly feasible to run when the tasks are relatively idle.

Variants. Many simplifications and modifications to the above algorithm can be made. Some examples may include: (1) In some variants servers may be simply divided into two sets, HIGH and LOW based on their utilization. HIGH servers may be scheduled before LOW ones. (2) In some variants instead of dividing the HIGH and MEDIUM sets, one may simply sort the sets based on load and schedule tasks with higher likelihood on the less loaded servers.

Example. Consider a ten (10) node cluster in which the node has the capacity to schedule ten (10) containers; therefore, there is a capacity of 100 containers. Assume there are twenty (20) container requests. Without task/container packing, each node would run two (2) containers, and any downscaling procedures would not identify any nodes or servers for downscaling (thereby failing to reduce costs). However, cluster utilization in this example is only 20%. With task/container packing, and using 80% as the HIGH_SERVER_THRESHOLD, two (2) nodes may be running eight containers each, and one node may be running four (4) containers, to satisfy a twenty (20) container request. Eight (8) nodes would be idle, and can be downscaled, resulting in cluster utilization of 67%.

It is to be understood that the invention is not limited in its application to the details of construction and the arrangements of components set forth in the following description. The embodiments discussed herein are to be understood as exemplary and in no way limiting of the overall scope of the invention. Also, it is to be understood that the phraseology and terminology used herein is for the purpose of description and should not be regarded as limiting. The matters exemplified in this description are provided to assist in a comprehensive understanding of various exemplary embodiments disclosed. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular. It is intended that all subject matter described herein and shown in the accompanying drawings be regarded as illustrative only, and not in a limiting sense, and that the scope of the invention will be solely determined by the appended claims.

What is claimed is:

1. A method of distributing tasks amongst servers or nodes in a cluster in a cloud-based big data environment, comprising:
  establishing a high_server_threshold;
  dividing active servers/nodes into at least three (3) categories comprising:
    (i) high usage servers, comprising servers on which usage is greater than the high_server_threshold;
    (ii) medium usage servers, comprising servers on which usage is less than the high_server_threshold, but is greater than zero; and (iii) low usage servers, comprising servers that are currently not utilized;

receiving one or more tasks to be performed;

scheduling the received one or more tasks by:
first requesting that medium usage servers take the one or more tasks;
if tasks remain that are not scheduled on the medium usage servers, schedule remaining tasks on low usage servers;
if any tasks remain that are not scheduled on medium usage servers or low usage servers, scheduling remaining tasks on high usage servers.

2. The method of claim 1, wherein the high_server_threshold is approximately sixty percent (60%).

3. The method of claim 1, wherein the high_server_threshold is approximately eighty percent (80%).

4. The method of claim 1, wherein the method is initiated after the cluster is above a minimum size.

5. The method of claim 1, wherein for new clusters that have not begun processing where all servers have zero utilization, the division of servers into medium usage servers and low usage servers is arbitrary or governed by external considerations including cost.

6. The method of claim 1, wherein task assignment to medium usage servers takes into account any resource requirements and any locality constraints.

7. The method of claim 1, wherein tasks assigned to medium usage servers are assigned evenly so that each medium usage server is allocated substantially the same amount of tasks.

8. The method of claim 1, wherein before tasks are scheduled to a low usage server, a locality delay may be used.

9. The method of claim 1, wherein selection of low usage servers for task assignment may be arbitrary or random, or may be governed by external considerations including cost.

10. The method of claim 1, wherein selection of high usage servers may be given to high usage servers with lower usage, to avoid hot-spots.

11. The method of claim 1, wherein the method has no impact on upscaling of the system.

12. The method of claim 1, wherein the method may be disabled if system downscaling results in the cluster being set to a minimum size.

13. The method of claim 1, further comprising determining if any task has been in a queue for an undesirably long period of time, and assigning such task to a first available server.

14. The method of claim 1, further comprising task rescheduling, comprising periodically stopping and restarting tasks, thereby automatically rescheduling tasks.

15. The method of claim 1, further comprising rescheduling tasks by identifying more optimal servers and migrating tasks to identified more optimal servers.

16. A method of distributing tasks amongst servers or nodes in a cluster in a cloud-based big data environment, comprising:
establishing a high_server_threshold;
dividing active servers/nodes into at least three (3) categories comprising:
high usage servers, comprising servers on which usage is greater than the high_server_threshold;
(ii) medium usage servers, comprising servers on which usage is less than the high_server_threshold, but is greater than zero; and
(iii) low usage servers, comprising servers that are currently not utilized;
receiving one or more tasks to be performed;
scheduling the received one or more tasks by:
first requesting that high usage servers take the one or more tasks;
if tasks remain that are not scheduled on the high usage servers, schedule remaining tasks on medium usage servers;
if any tasks remain that are not scheduled on high usage servers or medium usage servers, scheduling remaining tasks on low usage servers.

17. The method of claim 16, wherein the high_server_threshold is approximately eighty percent (80%).

18. The method of claim 16, further comprising sorting a list from high to low each category of active servers/nodes by the number tasks each has running for a specific application, and wherein tasks are scheduled in each category of servers/nodes into the first available server/node in this sorted list.

19. A method of distributing tasks for a specific application amongst servers or nodes in a cluster in a cloud-based big data environment, the method having no impact on upscaling of the system and initiated after the cluster is above a minimum size and disabled when the cluster is at a minimum size, the method comprising:
establishing a high_server_threshold;
dividing active servers/nodes into at least three (3) categories comprising:
(i) high usage servers, comprising servers on which usage is greater than the high_server_threshold;
(ii) medium usage servers, comprising servers on which usage is less than the high_server_threshold, but is greater than zero; and
(iii) low usage servers, comprising servers that are currently not utilized;
receiving one or more tasks to be performed;
scheduling the received one or more tasks by:
first requesting that medium usage servers take the one or more tasks, wherein medium usage servers are assigned tasks in accordance with any applicable resource requirement or locality constraint, and wherein such tasks are assigned evenly so that each medium usage server is allocated substantially the same amount of tasks;
if tasks remain that are not scheduled on the medium usage servers, schedule remaining tasks on low usage servers, wherein such scheduling on low usage servers is performed after a locality delay;
if any tasks remain that are not scheduled on medium usage servers or low usage servers, scheduling remaining tasks on high usage servers; and
if any task has been in a queue for an undesirably long period of time, such task is assigned to a first available server.

20. The method of claim 19, further comprising sorting a list from high to low each category of active servers/nodes by the number tasks each has running for the specific application, and wherein tasks are scheduled in each category of servers/nodes into the first available server/node in this sorted list.

* * * * *